US012792131B2

(12) United States Patent
Freedman et al.

(10) Patent No.: US 12,792,131 B2
(45) Date of Patent: Nov. 10, 2026

(54) SYSTEM AND METHOD FOR A GUEST TO INTERACT WITH AN INTERACTIVE AREA

(71) Applicant: Universal City Studios LLC, Universal City, CA (US)

(72) Inventors: Daniel Matthew Freedman, Orlando, FL (US); Daniel Patrick Melvold, Orlando, FL (US); Eric Allan Vance, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 248 days.

(21) Appl. No.: 18/635,267

(22) Filed: Apr. 15, 2024

(65) Prior Publication Data

US 2025/0138625 A1 May 1, 2025

Related U.S. Application Data

(60) Provisional application No. 63/593,291, filed on Oct. 26, 2023.

(51) Int. Cl.

| | |
|---|---|
| ***G06F 3/048*** | (2013.01) |
| ***G06F 3/01*** | (2006.01) |
| ***G06F 3/0488*** | (2022.01) |
| ***G06F 3/14*** | (2006.01) |
| ***G06F 3/16*** | (2006.01) |

(52) U.S. Cl.

CPC ............ *G06F 3/011* (2013.01); *G06F 3/0488* (2013.01); *G06F 3/1423* (2013.01); *G06F 3/167* (2013.01)

(58) Field of Classification Search

None

See application file for complete search history.

(56) References Cited

U.S. PATENT DOCUMENTS

| | | | | |
|---|---|---|---|---|
| 9,471,192 | B2 * | 10/2016 | Mason | G06F 3/04886 |
| 9,666,194 | B2 | 5/2017 | Ondeck et al. | |
| 11,640,626 | B2 | 5/2023 | Hanley et al. | |
| 2016/0055429 | A1 | 2/2016 | Schwartz | |
| 2020/0223360 | A1 * | 7/2020 | Bruno | B62D 15/029 |
| 2020/0320592 | A1 * | 10/2020 | Soule | G06Q 30/0271 |
| 2020/0384371 | A1 * | 12/2020 | Karafin | G03H 1/2205 |
| 2021/0110706 | A1 * | 4/2021 | Graefe | G01C 21/206 |
| 2021/0248519 | A1 | 8/2021 | Puglisi et al. | |
| 2023/0164530 | A1 * | 5/2023 | Tessler | H04W 4/80 455/41.3 |
| 2023/0305661 | A1 * | 9/2023 | Holguin | G06F 3/04186 |

OTHER PUBLICATIONS

PCT/US2024/052659 International Search Report and Written Opinion mailed Jan. 23, 2025.

* cited by examiner

*Primary Examiner* — Thanh T Vu

(74) *Attorney, Agent, or Firm* — Fletcher Yoder, P.C.

(57) ABSTRACT

An interactive area includes a first display disposed along a path for a queue for an attraction. The interactive area also includes a recognition and tracking system configured to recognize or to identify a guest upon entering the queue and to track the guest as they move along the path. The interactive area further includes a controller coupled to the recognition and tracking system. The controller is configured to cause first display to exhibit a user interface that moves with the guest along the first display as the guest moves along the path.

20 Claims, 6 Drawing Sheets

SYSTEM AND METHOD FOR A GUEST TO INTERACT WITH AN INTERACTIVE AREA

CROSS-REFERENCE TO RELATED APPLICATIONS

The present application claims priority to and the benefit of U.S. Provisional Application No. 63/593,291, entitled "SYSTEM AND METHOD FOR A GUEST TO INTERACT WITH AN INTERACTIVE AREA", filed on Oct. 26, 2023, the disclosure of which is hereby incorporated by reference in its entirety herein.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, interactive areas to entertain guests as they wait in line for a particular ride or attraction. It is now recognized that sometimes as the guest moves through the line interactive time with a particular interactive area in relation to a total time spent in line may be very brief. In addition, the interaction with the interactive area may be generic as opposed to personalized for the guest. As a result, the guest may become frustrated with the interactive area and/or have a reduced interest in the interactive area. Accordingly, it may be desirable to provide a more personalized experience to the guests in these interactive areas to enhance their experience.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive area includes a first display disposed along a path for a queue for an attraction. The interactive area also includes a recognition and tracking system configured to recognize or to identify a guest (e.g., via facial recognition) upon entering the queue and to track the guest as they move along the path. The interactive area further includes a controller coupled to the recognition and tracking system. The controller is configured to cause the first display to exhibit a user interface that moves with the guest along the first display as the guest moves along the path.

In an embodiment, a method for a guest to interact with an interactive area includes recognizing or identifying, via a recognition and tracking system, the guest upon entering a queue for an attraction. The method also includes tracking, via the recognition and tracking system, the guest as the guest moves along a path for the queue. The method further includes displaying, in response to control signals from a controller coupled to the recognition and tracking system, a user interface on a display along the path that moves proximate to the guest along the display as the guest moves along the path.

In an embodiment, a system for guests to interact with an interactive area includes a display disposed along a path for a queue for an attraction. The system also includes a recognition and tracking system configured to recognize or to identify a plurality of guests (e.g., via facial recognition) upon entering the queue and to track each guest of the plurality of guests as they move along the path. The system further includes a controller coupled to the recognition and tracking system. The controller is configured to generate a user interface on the display for each guest and wherein each respective each user interface moves with its respective guest along the display as each guest moves along the path. The system even further includes one or more user devices that enable each guest to interact with their respective user interface as each guest moves along the path.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
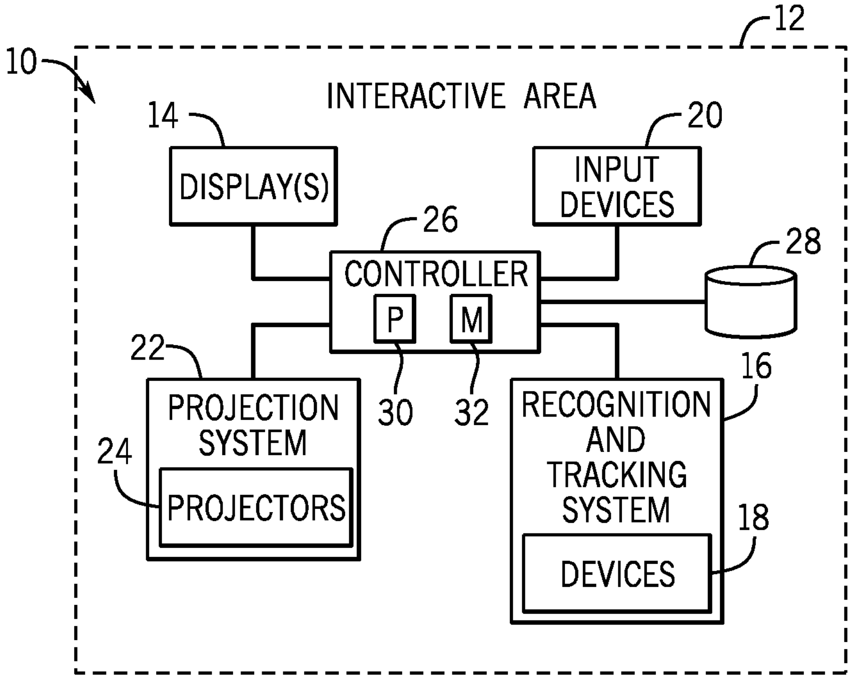
FIG. 1 is a schematic view of a system for a guest to interact with an interactive area, in accordance with aspects of the present disclosure.
Figure 2:
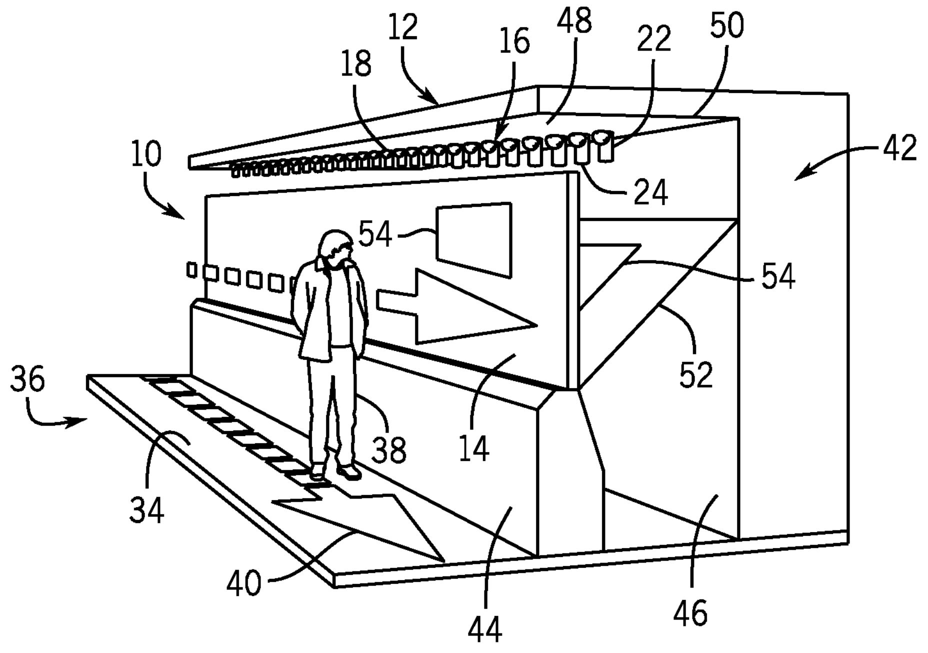
FIG. 2 is perspective view of an interactive area, in accordance with aspects of the present disclosure.
Figure 3:
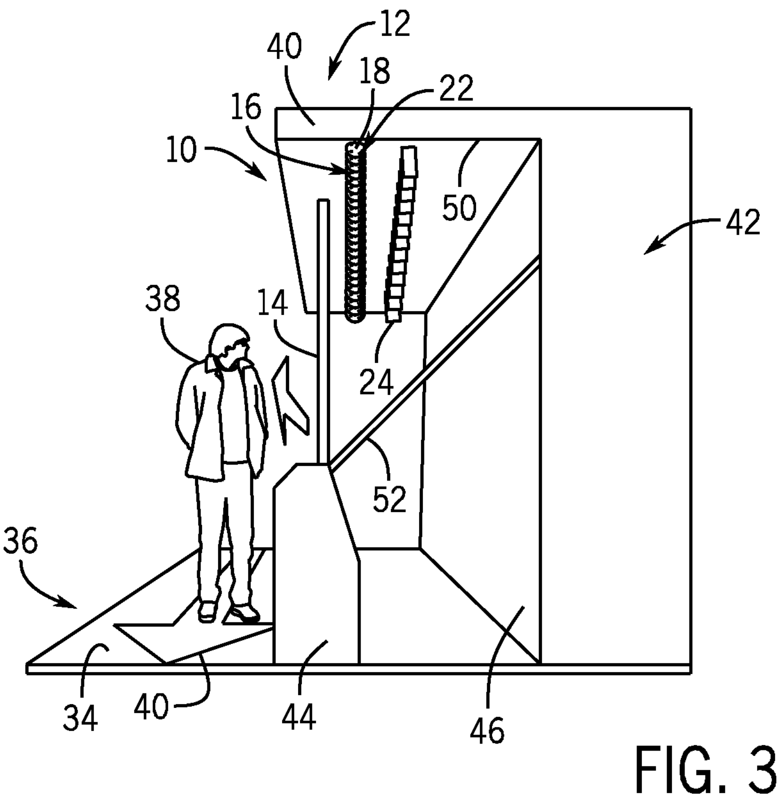
FIG. 3 is an end view of the interactive area in FIG. 1, in accordance with aspects of the present disclosure.
Figure 4:
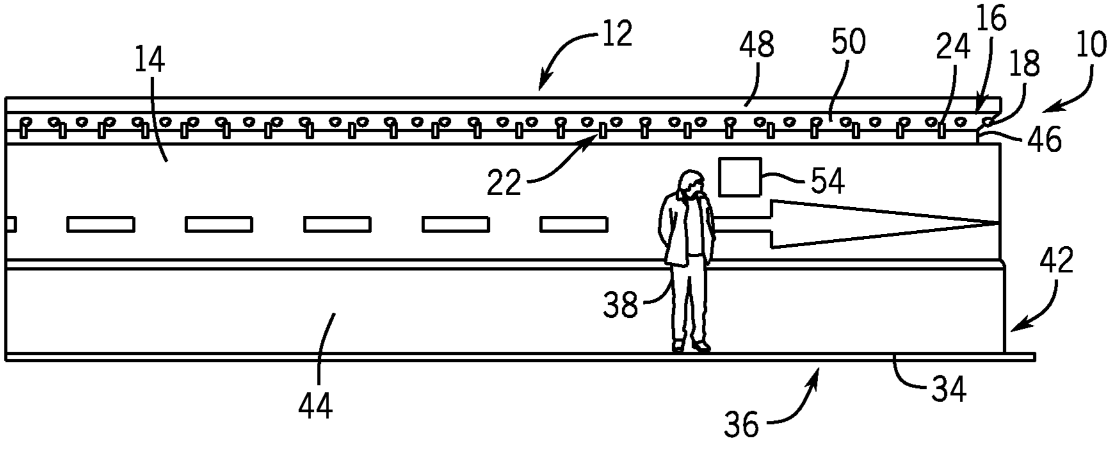
FIG. 4 is a side view of the interactive area in FIG. 1, in accordance with aspects of the present disclosure.
Figure 5:
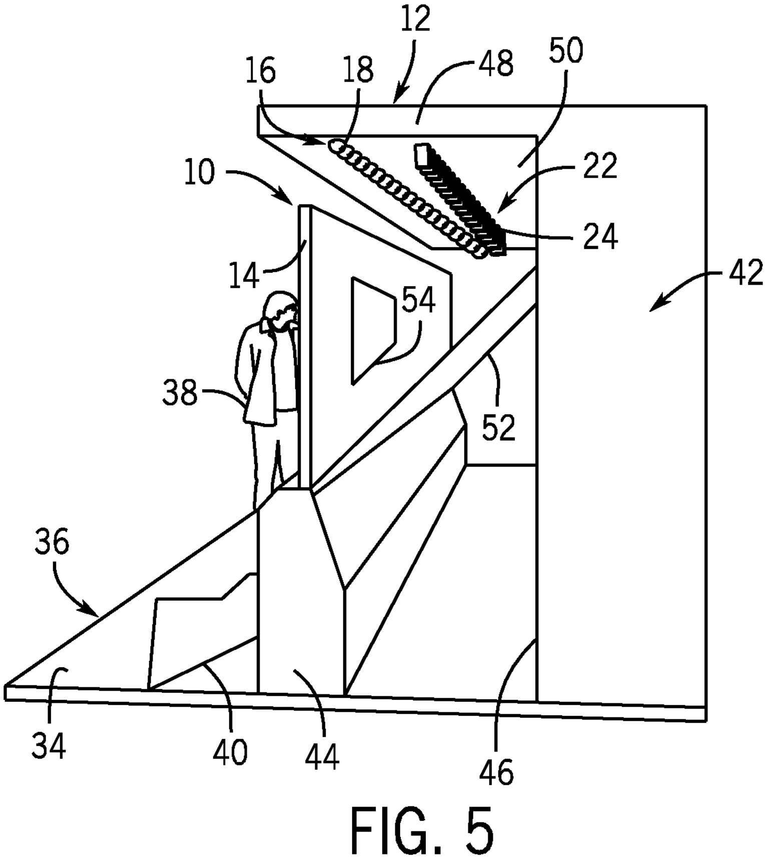
FIG. 5 is an end view of the interactive area in FIG. 1, in accordance with aspects of the present disclosure.

The present disclosure relates generally to interactive areas (e.g., kiosks) for guests. More specifically, embodiments of the present disclosure relate to a system and a method for enabling a guest interact with an interactive area as they move through the interactive area.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments of the disclosure are directed to systems and methods for guests to interact with an interactive area (e.g., one or more kiosks, queue structures, or the like). The interactive area may be disposed along a path for a queue (e.g., line) for an attraction (e.g., ride, show, or other attraction). The interactive area may include a moving walkway that may be disposed along the path for moving the guests through the queue. In accordance with an embodiment, the interactive area includes at least one display disposed along the path for the queue. In an embodiment, the interactive area also includes a recognition and tracking system configured to recognize or to identify guests (e.g., via facial recognition) upon entering the queue and to track the guests as they move along the path. The interactive area further includes a controller coupled to the recognition and tracking system. The controller is configured to display a user interface (e.g., a personal interface) or screen that moves with the guest (i.e., follows the guest) along the at least one display as the guest moves along the path. In certain embodiments, the guests may interact with the respective user interface or screen via touch (e.g., when the display functions as a touchscreen), via voice, or via a separate input device. In certain embodiments, gestures by the guests (e.g., thumbs up, thumbs down, etc.) may be recognized by the recognition and tracking system and utilized as guest inputs (e.g., to support guests with disabilities). In certain embodiments, the respective user interface or screen moves continuously along the at least one display as the guest moves along the path. In certain embodiments, the respective user interface or screen appears intermittently along the at least one display as the guest moves along the path (e.g., the respective user interface or screen appears when the guest is stationary along the path or when the guest faces the at least one display). The disclosed systems and methods may personalize the guest's experience with the interactive area. In addition, the disclosed systems and methods make the interactive area more engaging for the guest.

FIG. 1 is a schematic view of a system 10 for a guest to interact with an interactive area 12 (e.g., kiosk). The system 10 includes one or more displays 14 (e.g., display panels) disposed along a path for a queue for an attraction (e.g., ride, show, or other attraction). In certain embodiments, the queue may be for a food provider (e.g., dining place or restaurant). The interactive area 12 may be located at an amusement park or entertainment venue. The interactive area 12 may be associated with a particular theme. In certain embodiments, the one or more displays 14 may be transparent. In certain embodiments, the one or more displays 14 may function as a touchscreen to enable users to directly interact (via touch) with user interfaces (e.g., screens) displayed on the one or more displays 14.

The system 10 includes a recognition and tracking system 16 configured to recognize or to identify guests upon entering the queue and to track the guests as they move along the path. The recognition and tracking system 16 includes a plurality of devices 18 for recognizing and tracking the guests disposed along the path. In certain embodiments, the plurality of devices 18 include a plurality of recognition cameras for visual recognition (e.g., visual recognition) and tracking of guests. In certain embodiments, the plurality of devices 18 include a plurality of thermal cameras for utilizing heat signatures in recognizing and tracking guests. In certain embodiments, the plurality of devices 18 include a plurality of microphones (e.g., directional microphones, parabolic microphones, etc.) for audibly recognizing and tracking guests. In certain embodiments, the plurality of devices 18 include a plurality of radio frequency identification (RFID) readers disposed along the path and configured to recognize or to identify the guest and to track the guest via an RFID tag in a device (e.g., object worn or handled by the guest such as a wristband, necklace, etc.) associated with the guest. In certain embodiments, the guests may be recognized and tracked via an input device 20 handled by a guest. Each guest may be distributed an input device 20 at the beginning of the queue. The guest may provide identifying information via the input device 20. In certain embodiments, the guests may be identified or tracked via an application (e.g., specific to the amusement or entertainment venue) on their own input device 20 (e.g., computing device such as a tablet, smart phone, etc.). In certain embodiments, the recognition and tracking system 16 may utilize a combination of these types of devices in recognizing and tracking the guests. In certain embodiments, gestures by the guests (e.g., thumbs up, thumbs down, etc.) may be recognized by the recognition and tracking system 16 and utilized as guest inputs (e.g., to support guests with disabilities).

In certain embodiments, the system 10 includes a projection system 22. In certain embodiments, the projection system 22 includes a plurality of projectors 24 disposed along the path. The projection system 22 projects respective user interfaces (or screens) on the one or more displays 14 for the respective guests that move along the one or more displays as the guests move along the path. In certain embodiments, the projection system 22 may directly project the user interfaces or screens on the one or more displays 14. In certain embodiments, the projection system 22 may project the user interfaces or screens on a reflective surface or panel (e.g., Pepper's Ghost mirror film or light emitting diode (LED) panel) which reflects the user interfaces or screens on the one or more displays 14.

The system 10 further includes a controller 26. The controller 26 is coupled to the one or more displays 14, the recognition and tracking system 16, and the projection system 22. In certain embodiments, the controller 26 may be coupled to a database 28 to retrieve identifying information about a guest based on information received from the one or more displays 14, the recognition and tracking system 16, and/or the input devices 20. In certain embodiments, the controller 26 may store information about or received from a guest via the one or more displays 14, the recognition and tracking system 16, and/or the input devices 20.

The controller 26 includes one or more processors 30 and a memory 32. The one or more processors 30 execute instructions contained in the memory 32. The instructions may be loaded in a random access memory (RAM) for execution by the processors 30 from a read only memory (ROM), a mass storage device, or some other persistent storage. In other embodiments, hard wired circuitry may be used in place of or in combination with software instructions to implement the functions described. For example, the processors 30 may be embodied as part of one or more application-specific integrated circuits (ASICs). The one or more processors 30 may generate control signals to components of the system 10 (e.g., the one or more displays 14, the recognition and tracking system 16, the one or more input device 20, and the projection system 22). Control signals from the processors 30 may be provided via a wired or wireless connection.

The controller 26 is configured to identify or to recognize each guest upon entering the queue (via the recognition and tracking system 16). The controller 26 is also configured to track each guest as they move along the path for the queue (via the recognition and tracking system 16). The controller 26 is further configured to display (e.g., via control signals to the display 14 and/or the projection system 22) of a user interface (e.g., screen) on the display 14 for each guest, wherein each user interface moves with each respective guest (in coordination with the recognition and tracking system 16) along the display 14 as each guest moves along the path. In certain embodiments, the controller 26 is configured to cause the respective user interface or screen for a guest to move continuously along the display 14 as the guest moves along the path. In certain embodiments, the controller 26 is configured to cause the respective user interface or screen for a guest to intermittently appear along the display 14 as the guest moves along the path. For example, the controller 26 may be configured to cause the respective user interface or screen to only appear along the display 14 when the guest is essentially stationary along the path. Specifically, for example, a guest may be considered stationary when movements of the guests are within a two meter radius for a period of time (e.g., 3 seconds or more). In another example, the controller 26 may be configured to cause the respective user interface or screen to only appear along the display 14 when the guest is facing the display 14.

In certain embodiments, the system 10 includes a plurality of displays 14 that are separate and spaced apart. For example, a path for a queue may be disposed along multiple segments (sometimes separated by turns) and a respective display 14 may be disposed along each segment of the path or multiple displays may be disposed along the same segment. The displays may be positioned proximate to one another or spaced apart. In an embodiment, the controller 26 is configured to cease displaying the user interface or screen on a first display during transition of the guest along the path from the first display to a second display and to display the user interface or screen on the second display upon the guest reaching the second display along the path.

In certain embodiments, the controller 26 is configured to calculate a wait time based on the position of the respective guest in the queue (e.g., based on input from the recognition and tracking system 16). The controller 26 may then cause the wait time to be provided (occasionally or continuously) on the user interface or screen as the guest moves along the queue. In certain embodiments, the wait time may be provided on the user interface or screen in response to an inquiry from the guest.

The user interface or screen may be displayed on the display 14 as soon as the guest reaches the point of the queue where the display 14 begins. In certain embodiments, identification or recognition of the guest may occur prior to the guest reaching the display 14. In certain embodiments, identification or recognition of the guest may occur upon the guest reaching the beginning of the display 14. In certain embodiments, the guests may self-identify themselves via input provided to their respective user interface or screen on the display 14 (e.g., directly via touchscreen of display or via voice). In certain embodiments, the guests may identify themselves via information provided to the input device 20. In certain embodiments, identifying information may be retrieved via a device (e.g., having an RFID tag) worn or handled by the guest.

In certain embodiments, the guests may interact (e.g., directly or indirectly) with their respective user interface or screen on the display 14. For example, the guests may interact directly with the respective user interface or screen via touching the display 14 (when the display 14 functions as a touchscreen). The guests may interact via voice with the respective user interface or screen (e.g., via microphones of the recognition and tracking system 16). The guests may also interact via a respective input device 20 with the respective user interface or screen. In certain embodiments, gestures by the guests (e.g., thumbs up, thumbs down, etc.) may be recognized by the recognition and tracking system and utilized as guest inputs (e.g., to support guests with disabilities) for interaction with the respective user interface or screen.

In certain embodiments, the respective user interface or screen may include or represent a component of a game that the guest can interact with. In certain embodiments, the respective user interface or screen may provide a survey interface (e.g., a mechanism for receiving feedback on an attraction experience). For example, questions may be displayed and a guest may provide input (e.g., answers, comments, suggestions, etc.) directly on the user interface (via touching the display 14), via voice, or via the input device 20. In certain embodiments, the respective user interface or screen may operate as a form for entering information (e.g., user preferences) related to the upcoming amusement attraction. The user preferences may be entered directly on the user interface (via touching the display 14), via voice, or via the input device 20. In certain embodiments, the respective user interface or screen may provide a commercial to promote an activity, product, or the like. Sometimes a respective user interface or screen may transition into a commercial or the like when the guest is no longer interacting with the respective user interface or screen. In certain embodiments, the respective user interface or screen is related to the theme of the amusement attraction. In certain embodiments, the respective user interface or screen may be a digital menu board (e.g., a menu for a queue to a dining area) that the guest can interact with to order and/or purchase food and/or beverages as they move along the queue. In certain embodiments, once the guest reaches the end of queue associated with a dining area, the food may be ready for the guest to pick up.

FIGS. 2-5 are different views of the interactive area 12 (e.g., kiosk) having the system 10 in FIG. 1. The interactive area 12 includes a moving walkway 34 that follows a path 36 for a queue. A guest 38 moves along the path 36 via the moving walkway 34 as indicated by arrow 40. A structure 42 is disposed proximate to and extends along the path 36. As depicted, the structure 42 includes a front wall 44, a back wall 46, and a top wall 48 extending from a top of the back wall 46 towards the front wall 44. The configuration of the structure 42 may vary from that depicted in FIGS. 2-5.

In one embodiment, components of the system 10 are coupled to the structure 42. The arrangement of the components of the system 10 on the structure 42 may vary from that depicted in FIGS. 2-5. In the illustrated embodiment of FIG. 2, the display 14 is disposed on and extends along the front wall 44. In certain embodiments, the structure 42 may not include a front wall 44 and the display 14 may extend to the floor. The display 14 may be as described in FIG. 1. As depicted, the recognition and tracking system 16 is disposed on a bottom surface 50 of the top wall 48. In particular, a plurality of devices 18 (e.g., recognition or thermal cameras) are disposed (e.g., in a row) on the bottom surface 50 of the top wall 48 extending along the path 36. In certain, embodiments, the devices 18 may include microphones and/or RFID readers, which may be utilized by the recognition and tracking system 16. Further, the tracking system 16 may be positioned in any of various locations (e.g., along the moving walkway 34, along the front wall 44, on separate pedestals or towers) and in any configuration (e.g., an array or unevenly distributed).

A reflective surface or panel 52 (e.g., a mirror or reflective film) is disposed between (and extends between) the back wall 46 and the front wall 44. In the illustrated embodiment, the reflective surface or panel 52 extends downwardly from the back wall 46 in the direction of the path 36. As depicted, the reflective surface or panel 52 is disposed at an angle (e.g., 45 degree angle) relative to a horizontal plane extending between the back wall 46 and the front wall 44. This allows for reflection of imagery generated from the projection system 22 overhead toward the display 14. Indeed, the projection system 22 is disposed on the bottom surface 50 of the top wall 48 behind the devices 18 of the recognition and tracking system 16. However, in other embodiments, the projection system 22 could be disposed below the reflective surface or panel 52 and the reflective surface or panel 52 may be angled upwardly from the back wall in the direction of the path 36.

In particular, in the illustrated embodiment, the projection system 22 includes a plurality of projectors 24 disposed (e.g., in a row) on the bottom surface 50 extending along the path 36. The projection system 22 projects respective user interfaces (or screens) 54 on the display 14 via reflection from the panel 52 so that the user interfaces or screens 54 move along the display 14 for the respective guests 38 as the guests 38 move along the path 36 (in coordination with the tracking by the recognition and tracking system 16). As depicted, the projection system 22 projects the user interface or screen 54 on the reflective surface or panel 52 which reflects the user interface or screen 54 on display 14. In certain embodiments, the projection system 22 may directly project the user interface or screen 54 on the display 14. As depicted, the user interface or screen 54 moves along the display 14, as indicated by arrow 56, in conjunction with movement of the guest 38 along the path 36.

Figure 6:
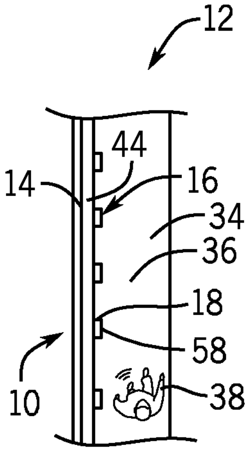
FIG. 6 is an overhead view of an interactive area that utilizes a plurality of microphones, in accordance with aspects of the present disclosure.

As mentioned above, the recognition and tracking system 16 may utilize different types of devices for recognizing and tracking the guests 38. FIG. 6 is a top view of the interactive area 12 that utilizes a plurality of microphones 58. In particular, the recognition and tracking system 16 includes the plurality of microphones 58 disposed along and proximate to path 36 that the guest 38 moves along (e.g., via the moving walkway 34). As depicted, the microphones 58 are spaced apart along the front wall 44. In certain embodiments, the microphones 58 may be disposed on a different structure within the interactive area 12. The microphones 58 may be directional microphones, parabolic microphones, or another type of microphone utilized to audibly recognize and track guests 38 via their respective voices. The microphones 58 may also be utilized to gather audio input for interacting with the user interfaces or screens 54.

Figure 7:
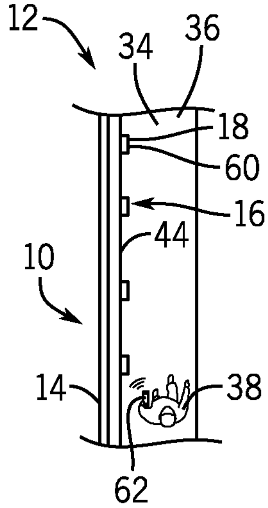
FIG. 7 is an overhead view of an interactive area that utilizes a plurality of radio frequency identification (RFID) readers, in accordance with aspects of the present disclosure.

FIG. 7 is a top view of the interactive area 12 that utilizes a plurality of RFID readers 60. In particular, the recognition and tracking system 16 includes the plurality of RFID readers 60 disposed along and proximate to path 36 that the guest 38 moves along (e.g., via the moving walkway 34). As depicted, the RFID readers 60 are spaced apart along the front wall 44. In certain embodiments, the RFID readers 60 may be disposed on a different structure within the interactive area 12. The RFID readers 60 are configured to recognize and track guests 38 via an RFID tag in a respective device 62 (e.g., object worn or handled by the guest 38 such as a wristband, necklace, etc.) associated with the guest 38.

Figure 8:
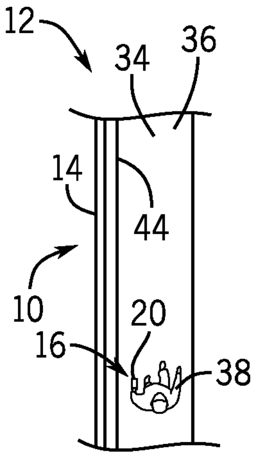
FIG. 8 is an overhead view of an interactive area that utilizes input devices, in accordance with aspects of the present disclosure.

FIG. 8 is a top view of the interactive area 12 that utilizes input devices 20. In particular, the recognition and tracking system 16 utilizes the input devices 20 to recognize and track guests 38. In certain embodiments, each guest 38 may be distributed a respective input device 20 at the beginning of the queue. The guest 38 may provide identifying information via the input device 20 and may also be tracked via the input device 20. In certain embodiments, the guests 38 may be identified or tracked via an application (e.g., specific to the amusement or entertainment venue) on their own input device 20 (e.g., computing device such as a tablet, smart phone, etc.).

Figure 9:
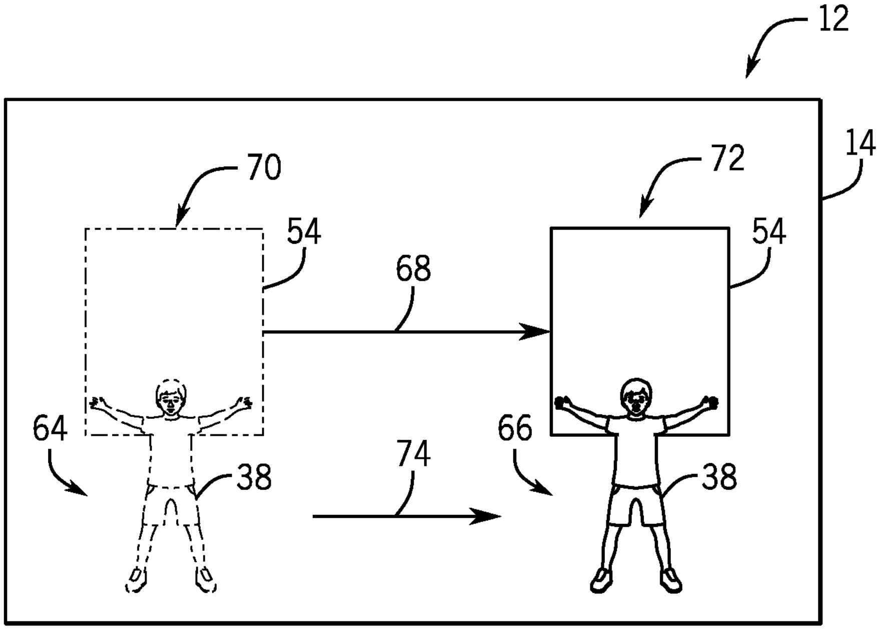
FIG. 9 is a schematic view of a continuous movement of a user interface or screen on a display, in accordance with aspects of the present disclosure.

FIG. 9 is a schematic view of a continuous movement of the user interface or screen 54 on the display 14. As depicted, the guest 38 moves from a first location 64 to a second location 66 as indicated by arrow 68. The user interface or screen 54 associated with the guest 38 also continuously moves from a first location 70 to a second location 72 along the display 14 as indicated by arrow 74 as the user moves 38.

Figure 10:
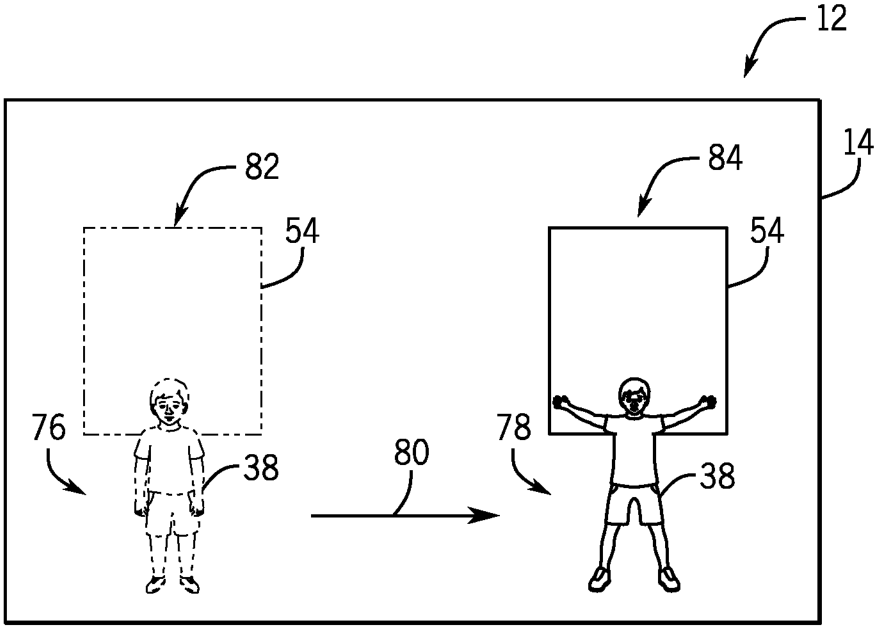
FIG. 10 is a schematic view of intermittent display of a user interface or screen on a display, in accordance with aspects of the present disclosure.

FIG. 10 is a schematic view of intermittent display of the user interface or screen 54 on the display 14. As depicted, the guest 38 moves from a first location 76 to a second location 78 as indicated by arrow 80. The user interface or screen 54 appears in a first location 82 and a second location 84. In certain embodiments, the first location 76 and the second location 78 represent locations where the guest 38 is stationary. In certain embodiments, the user interface or screen 54 only appears on the display 14 (in the first location 82 and the second location 84, respectively) when the guest 38 is stationary. Specifically, for example, the guest 38 may be considered stationary when movements of the guests 38 are within a two meter radius for a period of time (e.g., 3 seconds or more). In certain embodiments, the first location 76 and the second location 78 represent locations where the guest 38 faces the display 14. In certain embodiments, the user interface or screen 54 only appears on the display 14 (in the first location 82 and the second location 84, respectively) when the guest 38 faces the display 14.

Figure 11:
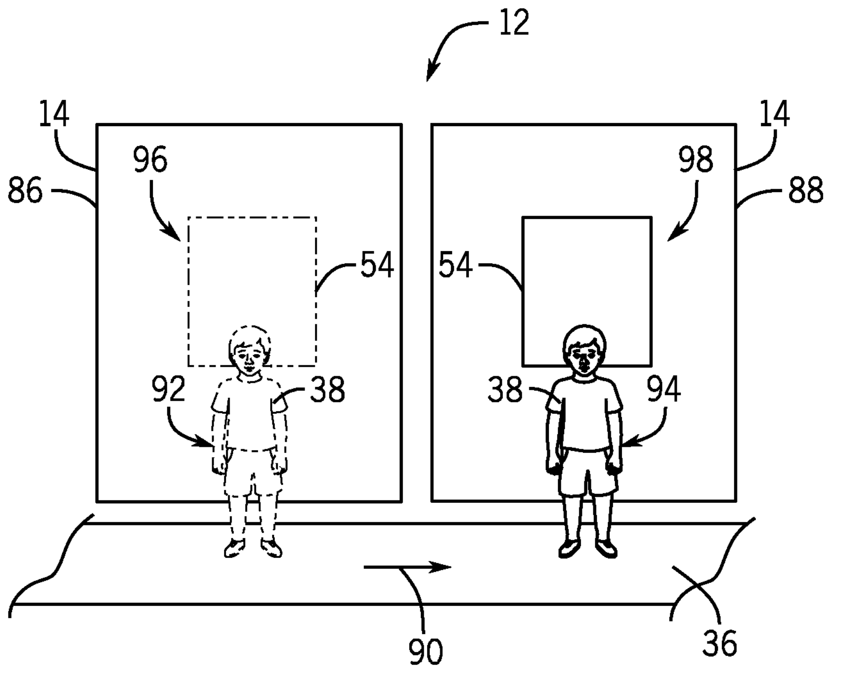
FIG. 11 is a schematic view of a user interface or screen moving from one display to another display, in accordance with aspects of the present disclosure.

FIG. 11 is a schematic view of the user interface or screen 54 moving from one display to another display. As depicted, the interactive area 12 includes a first display 86 and a second display 88 separate from and spaced apart from each other along the path 36. The guest 38 moves along the path 36 (e.g., via the moving walkway 34), as indicated by arrow 90, from a first location 92 in front of the first display 86 to a second location 94 in front of the second display 88. As the guest 38 moves from the first display 86 to the second display 88, the user interface or screen 54 also moves from a first location 96 on the first display 86 to a second location 98 on the second display 88 in correspondence with movement of the guest 38.

Figure 12:
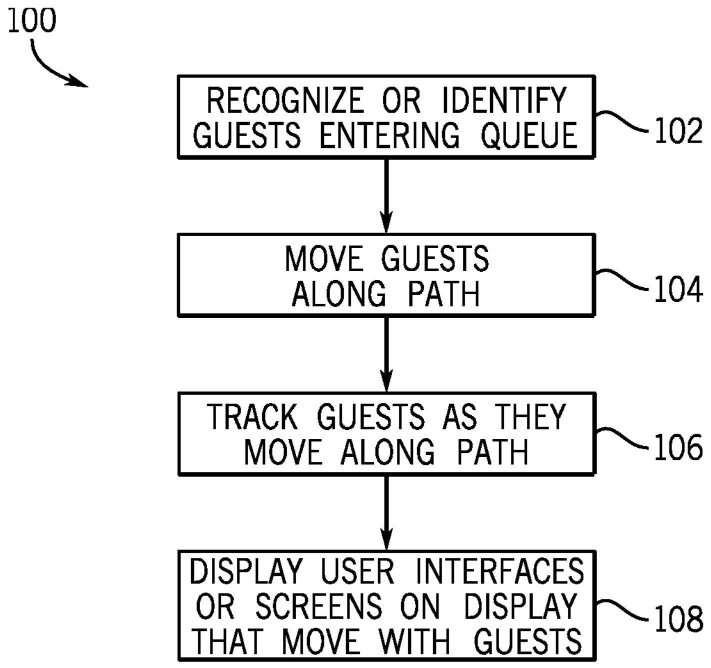
FIG. 12 is a flow chart of a method for a guest to interact with an interactive area, in accordance with aspects of the present disclosure.

FIG. 12 is a flow chart of a method 100 for a guest to interact with an interactive area. The steps of the method 100 may be performed by the system 10 as described in FIG. 1 (e.g., as part of an interactive area). The method 100 includes recognizing or identifying, via a recognition and tracking system (e.g., recognition and tracking system 16 in FIG. 1), guests upon entering a queue (e.g., line) for an attraction (block 102). In certain embodiments, the guests may self-identify themselves via input provided to their respective user interface or screen on the display (e.g., directly via touchscreen of display or via voice). In certain embodiments, the guests may identify themselves via information provided to an input device 20 associated with a respective guest. In certain embodiments, identifying information may be retrieved via a device (e.g., having an RFID tag) worn or handled by the guest. In certain embodiments, the guests may be recognized or identified via recognition cameras or thermal cameras (e.g., via facial recognition). In certain embodiments, the guest may be recognized or identified via microphones located in the interactive area.

The method 100 also includes moving the guests along the path via a walkway (e.g., moving walkway) disposed along the path (block 104). The method 100 also includes tracking, via the recognition and tracking system, the guests as the guests move along a path for the queue (block 106). In certain embodiments, the mechanism for recognizing and tracking the guests may be the same. In certain embodiments, the mechanism for recognizing and tracking the guests may be different. In certain embodiments, a plurality of recognition cameras may be utilized to track guests. In certain embodiments, a plurality of thermal cameras may heat signatures in tracking guests. In certain embodiments, a plurality of microphones (e.g., directional microphones, parabolic microphones, etc.) may be utilized to audibly track guests. In certain embodiments, a plurality of RFID readers disposed along the path may be utilized to track the guests (e.g., via an RFID tag in a device in an object worn or handled by the guest). In certain embodiments, the guests may be tracked via an input device handled by a guest.

The method 100 further includes displaying, in response to control signals from a controller (e.g., controller 26 in FIG. 1) coupled to the recognition and tracking system, a respective user interface or screen on a display (e.g., display 14 in FIG. 1) along the path that moves with each guest along the display as each guest moves along the path (block 108). In certain embodiments, the respective user interface or screen for a guest moves continuously along the display as the guest moves along the path. In certain embodiments, the respective user interface or screen for a guest intermittently appears along the display as the guest moves along the path. For example, the respective user interface or screen may only appear along the display when the guest is stationary along the path. In another example, the respective user interface or screen may only appear along the display when the guest is facing the display. In certain embodiments, where the interactive are includes multiple displays (e.g., proximate displays that are separate from and spaced apart from each other), the respective user interface or screen associated with a guest may move from one display to another display as the guest moves along the path between the displays. In certain embodiments, the guest may interact with the respective user interface or screen. For example, the guests may interact (e.g., directly or indirectly) with their respective user interface or screen on the display 14. For example, the guest may interact directly with the respective user interface or screen via touching the display (when the display functions as a touchscreen). In another example, the guest may interact via voice with the respective user interface or screen (e.g., via microphones). In a further example, the guest may also interact via a respective input device with the respective user interface or screen.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. An interactive area comprising:

a first display disposed along a path for a queue for an attraction;

a recognition and tracking system configured to recognize or to identify a guest upon entering the queue and to track the guest as they move along the path; and a controller coupled to the recognition and tracking system, wherein the controller is configured to cause the first display to exhibit a user interface on the first display and to move the user interface with the guest along the first display as the guest moves along the path, wherein the recognition and tracking system is configured to recognize or to identify a plurality of guests upon entering the queue and to track each recognized or identified guest as they move along the path, and wherein the controller is configured to display a respective user interface on the first display for each recognized or identified guest, and wherein each respective user interface moves with its respective guest along the first display as each respective guest moves along the path.

2. The interactive area of claim 1, wherein the controller is configured to cause each respective user interface to move proximate to each respective guest, for a period of time along the first display as each respective guest moves along the path.

3. The interactive area of claim 1, wherein the controller is configured to cause each respective user interface to intermittently appear along the first display proximate to each respective guest as each respective guest moves along the path.

4. The interactive area of claim 3, wherein the controller is configured to cause each respective user interface to appear proximate to each respective guest along the first display only when each respective guest is stationary along the path.

5. The interactive area of claim 1, wherein a second display is disposed along the path for the queue for the attraction, the second display is both separate from and spaced apart from the first display, and the controller is configured to cause the second display to exhibit each respective user interface previously displayed on the first display during a transition of each respective guest along the path from a position proximate to the first display to a position proximate to the second display.

6. The interactive area of claim 1, wherein the controller is coupled to the first display, and wherein the first display comprises a touchscreen configured to enable each respective guest to directly interact with each respective user interface.

7. The interactive area of claim 1, further comprising a projection system configured to project the user interface on the first display, wherein the controller is coupled to the projection system and is configured to cause display of each respective user interface on the first display via signals sent to the projection system.

8. The interactive area of claim 7, wherein the projection system comprises both a plurality of projectors and one or more reflective surface disposed behind the first display along the path, wherein the plurality of projectors are configured to cause each respective user interface to be projected on the one or more reflective surface, and the one or more reflective surface is configured to reflect each respective user interface on the first display.

9. The interactive area of claim 1, wherein the recognition and tracking system comprises a plurality of directional microphones disposed along the path.

10. The interactive area of claim 9, wherein the plurality of directional microphones are configured to enable each respective guest to interact audibly with each respective user interface as each respective guest moves along the path.

11. The interactive area of claim 9, comprising an input device configured to be handled by each respective guest to provide input to each respective user interface as each respective guest moves along the path.

12. The interactive area of claim 1, wherein the recognition and tracking system comprises a plurality of radio frequency identification (RFID) readers disposed along the path and configured to recognize or to identify each respective guest and to track each respective guest via an RFID tag in a device associated with each respective guest.

13. The interactive area of claim 1, further comprising a moving walkway disposed along the path.

14. A method for a guest to interact with an interactive area, the method comprising:

recognizing or identifying, via a recognition and tracking system, the guest upon entering a queue for an attraction;

tracking, via the recognition and tracking system, the guest as the guest moves along a path for the queue; and displaying, in response to control signals from a controller coupled to the recognition and tracking system, a user interface on a display that extends along the path and moving the user interface proximate to the guest along the display as the guest moves along the path, wherein the recognition and tracking system is configured to recognize or to identify a plurality of guests upon entering the queue and to track each recognized or identified guest as they move along the path, and wherein the controller is configured to display a respective user interface on the display for each recognized or identified guest, and wherein each respective user interface moves with its respective guest along the display as each respective guest moves along the path.

15. The method of claim 14, wherein displaying each respective user interface comprises continuously displaying and moving each respective user interface along the display proximate to each respective guest as each respective guest moves along the path.

16. The method of claim 14, wherein displaying each respective user interface comprises intermittently displaying each respective user interface proximate to each respective guest along the display as each respective guest moves along the path.

17. The method of claim 14, wherein the display comprises a touchscreen, and the method further comprises receiving a user input from each respective guest with each respective user interface via the touchscreen.

18. The method of claim 14, further comprising moving each respective guest along the path via a walkway disposed along the path.

19. A system for guests to interact with an interactive area, the system comprising:

a display disposed along a path for a queue for an attraction;

a recognition and tracking system configured to recognize or to identify a plurality of guests upon entering the queue and to track each recognized or identified guest of the plurality of guests as they move along the path;

a controller coupled to the recognition and tracking system, wherein the controller is configured to generate a respective user interface on the display for each recognized or identified guest and wherein the respective user interface moves with its respective guest along the display as the respective guest moves along the path; and one or more user devices that enable each guest to interact with their respective user interface as each guest moves along the path.

20. An interactive area comprising:

a first display disposed along a path for a queue for an attraction;

a recognition and tracking system configured to recognize or to identify a guest upon entering the queue and to track the guest as they move along the path; and a controller coupled to the recognition and tracking system, wherein the controller is configured to cause the first display to exhibit a user interface on the first display and to move the user interface with the guest along the first display as the guest moves along the path, wherein the controller is configured to cause the user interface to intermittently appear along the first display proximate to the guest as the guest moves along the path so that the user interface only appears on the first display when the guest faces the first display and the user interface disappears when the guest is not facing the first display.

* * * * *